No. 683,043. Patented Sept. 24, 1901.
A. F. HAYNES.
HAY OR GRAIN UNLOADER AND STACKER.
(Application filed Oct. 12, 1900.)
(No Model.)

Witnesses
A. F. Haynes, Inventor
by C. A. Snow & Co.
Attorneys

THE NORRIS PETERS CO., PHOTO-LITHO., WASHINGTON, D. C.

UNITED STATES PATENT OFFICE.

AVISON F. HAYNES, OF DUFUR, OREGON.

HAY OR GRAIN UNLOADER AND STACKER.

SPECIFICATION forming part of Letters Patent No. 683,043, dated September 24, 1901.

Application filed October 12, 1900. Serial No. 32,854. (No model.)

*To all whom it may concern:*

Be it known that I, AVISON F. HAYNES, a citizen of the United States, residing at Dufur, in the county of Wasco and State of Oregon, have invented a new and useful Hay or Grain Unloader and Stacker, of which the following is a specification.

My invention is an improved hay and grain unloading and stacking apparatus which is adapted for unloading hay or grain from a wagon onto a stack or rick, whereby the operations of unloading the wagon and forming the stack or rick are simultaneously performed; and it consists in the peculiar construction and combination of devices hereinafter fully set forth, and pointed out in the claim.

Figure 1:
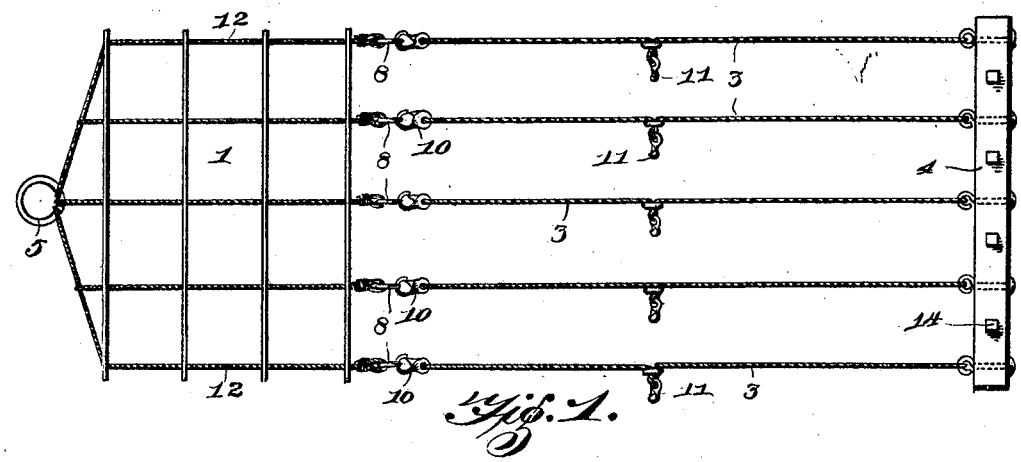
Figure 2:
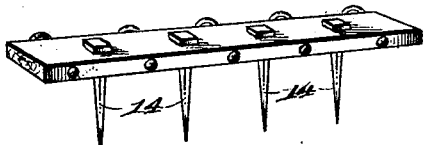
Figure 3:
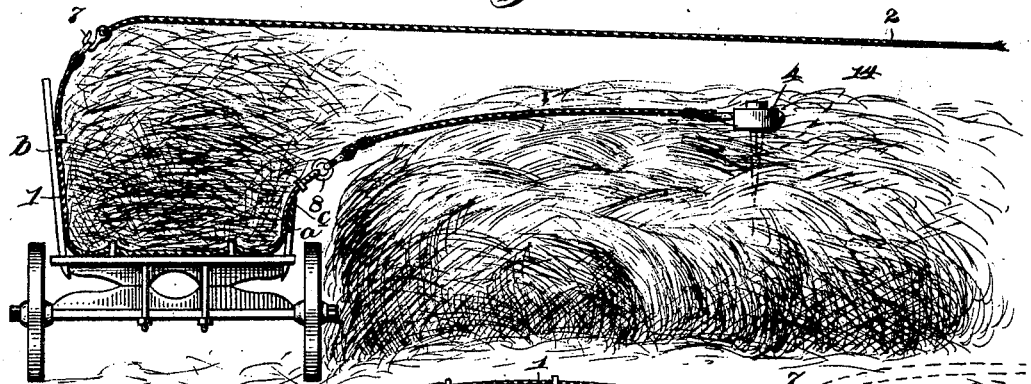
Figure 4:

In the accompanying drawings, Figure 1 is a top plan view of a hay and grain unloading and stacking apparatus embodying my improvements. Fig. 2 is a detail perspective view of the anchor-bar. Fig. 3 is an elevation illustrating the method of using my invention to unload hay or grain from a wagon onto a stack. Fig. 4 is a similar view of the same, showing the apparatus in the position assumed thereby when rolling a load of hay or grain from a wagon onto a stack.

Preferably the wagon which is used in connection with my improved unloading and stacking apparatus should have its sides $a$ $b$ unequal in height and the lower side $a$ provided with notches $c$ in its upper edge. The unloading apparatus comprises a wagon-net 1, a pull-rope 2, extension-ropes 3, and an anchor-bar 4. The wagon-net is of suitable size to extend entirely across the bed of the wagon and to overhang the sides thereof. The side of the net which overhangs the higher side $b$ of the wagon-body is provided with a ring 5, to which the pull-rope 2 may be attached by a hook 7. Any other suitable means may, however, be employed for attaching the pull-rope to one side of the net. The side of the net which overhangs the lower side $a$ of the wagon is provided with rings 8, adapted for the attachment of the extension-ropes 3 by means of the hooks 10 at the outer ends of the extension-ropes, or the hooks 11, with which said extension-ropes are provided, at points intermediate of their ends, the hooks 11 permitting the ropes 3 to be lengthened or shortened, as desired. The transverse ropes 12 of the wagon-net when the same is in the wagon-bed are disposed in the notches $c$, which prevent the said ropes from being displaced or injured by the header-spout. The extension-ropes are attached to an anchor-bar 4, which is provided with a suitable number of downward-extending teeth 14, which project from its lower side and are adapted to be buried in the hay or grain on a stack. The wagon-net 1 is disposed across the bed of the wagon, as hereinbefore described, before the wagon is loaded. To unload the same, the wagon is driven to the stack or rick with its lower side next to the stack or rick, the extension-ropes are attached to the wagon-net, and the teeth of the anchor-bar are buried in the hay or grain on the stack. The pull-rope is attached to the ring 5 and extended over the load in the wagon and over the stack or rick and in line with the net and extension-ropes. A man stationed on the stack or rick should then stand on the anchor-bar to prevent the teeth thereof from disengaging the stack or rick, and the team attached to the pull-rope being then started the wagon-net and extension-ropes roll the load out of the wagon and onto the stack or rick. As soon as a portion of the weight of the load is on the extension-ropes the man on the anchor-bar steps therefrom, and as the load continues to roll on the stack or rick it clears the anchor-bar, becomes deposited on the stack or rick, and finally the extension-ropes draw upward on the anchor-bar and disengage the same from the stack or rick, the entire apparatus being drawn clear of the stack or rick after having deposited the load thereon. Hence no portion of the apparatus is left buried on the stack or rick and remains to be recovered after the load has been placed on the stack or rick, and hence a serious objection heretofore existing to apparatus of this class is obviated.

I have demonstrated in the reduction of my invention to practice that the anchor-bar is entirely efficient to prevent the net and extension-ropes from slipping from under the load in the wagon.

In my improved apparatus I obviate the use of stakes and other means than the anchor-bar for securing the necessary "purchase" in unloading the hay or grain from the wagon onto the stack or rick.

Another advantage gained by my improved apparatus is that by the use of the same I am enabled to unload a wagon at any side of the stack or rick and to deposit a load from a wagon at any desired point on the stack or rick.

Having thus described my invention, I claim—

In an apparatus of the character specified, the combination with a wagon having sides of unequal height, the lower side being provided in its upper edges with notches, of a net arranged on the bottom of the wagon and against the sides thereof, and having its transverse ropes seated in the said notches whereby to shield the rope from injury, said net being provided at the high side of the wagon with a ring, a pull-rope provided with means for detachably engaging the ring, an anchor-bar provided with depending teeth, and extension-ropes secured at their outer ends to the anchor-bar and at their inner ends to the side of the net at the lower side of the wagon, the extension-ropes being provided along their lengths with means for attachment to the net, whereby shortening or lengthening said ropes may be effected, as desired, substantially as and for the purpose described.

In testimony that I claim the foregoing as my own I have hereto affixed my signature in the presence of two witnesses.

AVISON F. HAYNES.

Witnesses:
WALDO BRIGHAM,
F. D. FRAZIER.